(12) United States Patent
Jerebko

(10) Patent No.: US 9,361,711 B2
(45) Date of Patent: Jun. 7, 2016

(54) LESION-TYPE SPECIFIC RECONSTRUCTION AND DISPLAY OF DIGITAL BREAST TOMOSYNTHESIS VOLUMES

(71) Applicant: SIEMENS AKTIENGESELLSCHAFT, Munich (DE)

(72) Inventor: Anna Jerebko, Hausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 103 days.

(21) Appl. No.: 13/958,775

(22) Filed: Aug. 5, 2013

(65) Prior Publication Data

US 2015/0036903 A1 Feb. 5, 2015

(51) Int. Cl.
*G06T 7/00* (2006.01)
*G06T 11/00* (2006.01)

(52) U.S. Cl.
CPC ............ *G06T 11/006* (2013.01); *G06T 11/008* (2013.01); *G06T 2211/436* (2013.01)

(58) Field of Classification Search
None
See application file for complete search history.

(56) References Cited

U.S. PATENT DOCUMENTS

2006/0122467 A1* 6/2006 Harrington et al. ............ 600/300
2008/0310583 A1* 12/2008 Truyen .................... A61B 6/032
378/8
2011/0110576 A1* 5/2011 Kreeger .............. G06F 19/3406
382/132
2012/0053446 A1* 3/2012 Lossev .................. G06T 7/0012
600/407

OTHER PUBLICATIONS

Bissonnette, M., et al., "Digital breast tomosynthesis using an amorphous selenium flat panel detector" Proceedings of SPIE, 5745, Medical Imaging 2005: Physics of Medical Imaging, 529 (Aug. 30, 2005); doi:10.1117/12.601622.
Mertelmeier, T., et al., "Optimizing filtered backprojection reconstruction for a breast tomosynthesis prototype device" Proceedings of SPIE, 6142, Medical Imaging 2006: Physics of Medical Imaging, 61420F (Mar. 2, 2006); doi:10.1117/12.651380.

* cited by examiner

Primary Examiner — Utpal Shah
Assistant Examiner — Mai Tran
(74) *Attorney, Agent, or Firm* — Laurence Greenberg; Werner Stemer; Ralph Locher

(57) ABSTRACT

A method, a control unit and a system for image reconstruction and visualization of a tomosynthesis volume. Different region of interests are detected in the volume and specific types of lesions are determined. Based on the type of lesion, different reconstruction parameters and different reconstruction algorithms are applied in order to reconstruct a subvolume or a region in a projection. After displaying the digital breast tomosynthesis volume, a user selection signal is received, in order to identify a selection area. The selection area identifies a region in the volume which should be reconstructed differently from the remaining volume and typically with higher resolution, because it refers to a region of specific interest. After having received the user selection signal the selection area is defined and a pre-computed or online-computed reconstruction of the selection area is visualized. The reconstruction is executed according to the determined lesion type specific reconstruction parameters.

9 Claims, 5 Drawing Sheets

FIG 4
FIG 5
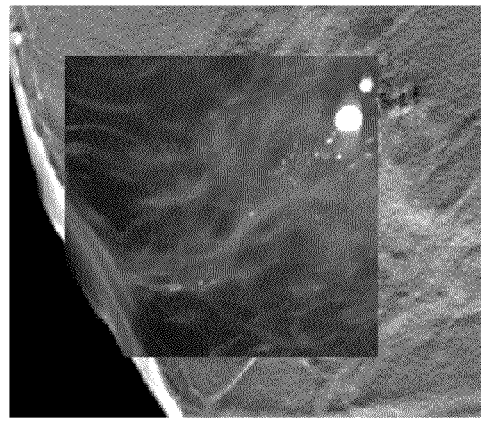

LESION-TYPE SPECIFIC RECONSTRUCTION AND DISPLAY OF DIGITAL BREAST TOMOSYNTHESIS VOLUMES

BACKGROUND OF THE INVENTION

Field of the Invention

The present invention, generally, refers to the reduction of the data volume to be processed for image reconstruction of a three-dimensional digital breast tomosynthesis volume (DBT). Particularly, the present invention relates to an image reconstruction method, which identifies different content categories within an image and processes this kind of information for image reconstruction. Thus, the field of technology relates to breast cancer detection and computer science as well.

Digital breast tomosynthesis volumes provide more information than regular full field digital mammography (FFDM—Full Field Digital Mammography) images for the early detection of abnormalities and cancer. Unfortunately, the reading time and therefore the cost of examination increases more than two-fold with digital breast tomosynthesis imaging compared to FFDM methods.

In conventional projection mammography it is possible that certain anatomical structures (for example calcium deposits or certain opacities) are not spotted or represented on the respective image, because superimposed structures disturb the visibility of underlying structures of the breast and in the end may lead to false positives or a negative interpretation of the image.

In order to overcome the limitations of conventional mammography, digital breast tomosynthesis methods have been developed, which acquire several projections of an object (the breast) at different angles and thereafter reconstruct the three-dimensional distribution of the detected grey values in a detector by means of a tomography reconstruction algorithm. With digital breast tomosynthesis it is possible to detect with higher accuracy lesions that might have been masked during the superimposition of the tissues that takes place during a classic mammography projection acquisition. In digital breast tomosynthesis the breast is imaged under compression. A sequence of projection views is acquired by the digital detector as the X-ray source is rotated to different angular positions about a fulcrum over a finite angular range. Anatomical structures or objects at different heights (or depths in the breast) are projected differently at different angles. The subsequent image reconstruction algorithm leads to a stack or a slab of slice images of the different depth layers parallel to the detector surface. This technique enables the physician during diagnosis to "browse through" the interior of the female breast without obstruction by surrounding superimposed tissue.

Further details and principles of digital breast tomosynthesis and respective apparatuses are disclosed in "Digital breast tomosynthesis using an amorphous selenium flat panel detector", M. Bissonnette et al., SPIE Vol. 5745, page 529 ff. For further information relating to reconstruction algorithms, particularly to filtered backprojection reconstruction algorithms it is referred to: "Optimizing filtered backprojection reconstruction for a breast tomosynthesis prototype device", T. Mertelmeier et al. in: SPIE 6142 (2006). The full content of these papers is incorporated here by reference.

A major drawback of tomosynthesis systems, however, is to be seen in that, typically, the digital volume contains 50 to 80 slices. Thus, the volume to be loaded, processed and stored is high.

One of the usual ways of reducing the amount of data for read and for storage in regular computer tomography is the reconstruction of the volume in thick slices. While the modern computer tomographs are capable of producing images of less than 0.5 mm slice thickness (for example in thoracic or in abdominal images), radiologists often read and analyze three-dimensional images reconstructed as thick slices or thick slabs (for example 2 to 5 mm).

However, a major drawback of state of the art reconstruction methods is that the diagnostically relevant information may be easily overlooked during diagnosis, because the diagnostic relevant regions are not uniformly distributed throughout the volume. For example some regions are of minor importance for the purpose of diagnosis or medicine in general and thus may be reconstructed in lower resolution without any loss of diagnostically relevant image features, whereas in other areas, where the probability of finding a lesion or an anatomical abnormality is high, a corresponding higher resolution is required for an accurate diagnosis. Thus, known conventional methods, which are based on reconstructing the entire volume with one single reconstruction algorithm for the whole volume, are not best suited. On the one hand, imaging the entire organ with very high resolution is not always possible, because of the storage space and reading time limitations. On the other hand, reconstructing only the relevant sub-volume with high resolution and not visualizing the surrounding areas of tissue at all does not provide enough diagnostic context.

There are numerous reconstruction algorithms and variations for digital breast tomosynthesis images. The different reconstruction algorithms differ in their parameter settings, in their ways to visualize the data and in their display options which are suitable for a digital breast tomosynthesis. Different reconstruction and optimization methods are optimal for visualizing different anatomical structures like masses, calcification clusters, scars, etc. Depending on the respective anatomical structure different reconstruction settings and parameters for the reconstruction algorithms have to be applied in order to visualize the respective anatomical structure as good as possible. For example, sometimes a very high resolution is necessary in order to be able to visualize the morphology of clusters of microcalcifications. Usually, a high resolution reconstruction is also necessary in the vicinity of a calcification cluster. However, other anatomical regions could be reconstructed with lower resolution. For example, it is impractical and time-consuming to reconstruct the whole volume with high resolution.

On the one hand, the reconstruction algorithms should therefore take into account machine resources and time consumption in order to provide a result of reconstruction (a visualization of the tomosynthesis image) in acceptable time. On the other hand it should be possible that a physician, who has to analyze and evaluate a plurality of images, has the option to select a region of interest, which he wants to analyze in a higher resolution and with a higher degree of detail. Up to now, in the state of the art a reconstruction and visualization method is known which enables a user to view an enlarged and magnified portion of an image. Particularly, a so-called "lens option" is provided as an additional tool within an image viewer (for example being part of a diagnostic workstation). When a user clicks on an image or an image portion and selects the lens option, the selected portion will be visualized in a magnified manner.

For example, the syngo system "MammoReport" of the Applicant SIEMENS AG offers such a lens option. For further details, reference is had to the publication syngo MammoReport, pages 45-49.

In the prior art and state of the art systems, including the lens-based systems mentioned above, it is not possible to show a different reconstruction with a significantly different resolution or differently optimized parameters, because such a reconstruction or multiple reconstructions cannot be computed online (for example upon receiving a user signal/mouse click). It is inefficient from a computation time and data storage point of view to pre-compute multiple reconstructions for the entire volume.

BRIEF SUMMARY OF THE INVENTION

Therefore, there is a need to provide a reconstruction method and control unit and a diagnostic workstation with such a control unit which considers different areas in the volume to be reconstructed, comprising regions of interest and selected areas and taking into account that different reconstruction algorithms are to be applied to the different anatomical structures (lesions and healthy structures), regions of interests and selected areas in the same volume to be reconstructed. Moreover, the user has to get the option to select specific areas in the tomosynthesis volume or in a set of projections, which he wants to reconstruct differently than the remaining volume/set of protections. "Differently" in this respect has to be construed in the sense of the reconstruction parameters, with respect to resolution, with respect to the reconstruction algorithm.

An aspect of the invention is directed to overcoming the drawbacks of the reconstruction systems of the prior art. The invention pertains to a computer-implemented method for reconstructing and visualizing a digital breast tomosynthesis volume or a set of projections, with the following method steps:

In a pre-computation phase:
receiving the digital breast tomosynthesis volume or a set of projections
applying a computer-aided detection algorithm (CAD algorithm) to the digital breast tomosynthesis volume or a set of projections in order to detect at least one region of interest
determining a type of lesion in the respective detected region of interest
accessing a look up table in order to determine lesion type-specific reconstruction parameters
reconstructing (i.e. pre-computing) at least one region of interest with lesion type specific reconstruction parameters;
In a visualization phase:
visualizing the digital breast tomosynthesis volume or a set of projections
in response to a user selection signal, identifying a selection area in the visualized digital breast tomosynthesis volume or in the set of projections:
visualizing a pre-computed or an online computed reconstruction of the selected area according to determined lesion type-specific reconstruction parameters in case the selection area is comprised within the region of interest or within the set of projections
visualizing a magnified, inverted or another available visualization of the selected area in case no pre-computed reconstruction is available for the selection area.

In other words the first visualization of a digital breast tomosynthesis volume may be amended or transferred into a second visualization upon receiving a user signal (user click on the first visualization). The second visualization refers only to a part of the displayed region or projection, namely to a selected area of the tomosynthesis volume or of the set of projections. The selected area is reconstructed with another reconstruction algorithm as the remaining part of the tomosynthesis volume (or the set of projections). Further, the reconstruction parameters are different for reconstructing the selected area than for reconstructing the remaining volume. Particularly, the reconstruction parameters may be optimized for the selected area, taking into account the type of lesion in the selected area.

According to a preferred embodiment the term "selection area" is identical with the term "selected area."

According to an embodiment of the present invention a computer-aided detection algorithm is used to determine regions of interest (ROI), which refer to areas in the digital breast tomosynthesis volume, comprising different anatomical structures with lesions, like masses, calcification, scars etc. Preferably, different reconstruction algorithms may be applied for the different anatomical structures in the volume. Thus, a lesion-type specific reconstruction algorithm may be applied. Further, it is also possible to use the same reconstruction algorithm for the different anatomical structures (healthy structures, scars, masses, calcification and others), but to use different parameter settings for the respective reconstruction algorithm. The parameter settings are preferably optimized for this specific type of lesion.

In a preferred embodiment of the present invention different types of reconstruction algorithms are already executed for all or for selected set of regions of interest. In this case, in the visualization phase it is possible to provide already a set of pre-computed visualizations. In case the user clicks on a specific position on an image or on a slice of a digital breast tomosynthesis volume, the pre-computed sub-volume or the corresponding region of interest is visualized. Preferably, the pre-computed sub-volume of the selected area is visualized in separate window on a monitor. Preferably, not only the respective click point is visualized accordingly, but also an area around the click point centered near, but not exactly the same with the click point may be considered for visualization. If no pre-computed sub-volume or selected area exists for the vicinity of the given click point, then, a regular magnified region of interest view of the current selected area is shown in the separate window.

However, it is not necessary to pre-compute regions of interest in the pre-computation phase. In another embodiment it is also possible to compute the selected area, defined by the user's click point on the visualized tomosynthesis volume or projection, according to determined lesion type specific reconstruction parameters online and thus in the visualization phase directly before visualization. Thus, preferably, the different visualizations may be computed on the fly and during visualization. Also, they may be pre-computed for the whole volume or for specific selected areas in the volume. The visualizations are based on reconstruction algorithms, which are specific for the respective type of lesion in the respective volume or projection. Multiple options could be offered on a user interface, to be selected for each click point. For example, a cluster of calcifications could be visualized with:
Rotating maximum intensity projection (MIP),
Maximum intensity projection slabs,
As a simulated two-dimensional mammogram region or a rotating mammogram,
Higher resolution reconstruction, Different type of reconstructions, e.g. iterative reconstruction, while the whole volume is reconstructed with another reconstruction algorithm, for example with a filtered back projection (FBP), Different filter settings for filtered back projection (FBP).

The reconstruction algorithms may be selected from the group consisting of MIP, average intensity projection (AIP), iterative reconstruction and filtered back projection (FBP). According to another preferred embodiment it is possible to provide different options for visualizing the selected area. Preferably, the selected area is visualized in at least one separate window, which may be embedded in the display of the remaining tomosynthesis volume or projection. The separate window may be superimposed on the other display. However, depending on the type of lesion, it is useful to provide different visualization strategies. For example, in other scenarios it is better to provide a set of separate windows, which are to be displayed on the screen, for example for clusters of calcifications. In other scenarios, it is better to only visualize one single separate window, showing a visualization of a specifically reconstructed selected area. Thus, different visualization options are offered for different lesion types. For example, a lens-type option may be chosen or an option which also visualizes annotations with respect to information of the selected area.

In another aspect, the present invention refers to a reconstruction control unit for reconstructing and visualizing a digital breast tomosynthesis volume or a set of projections. The control unit is adapted to execute the method mentioned above. The reconstruction control unit may be part of a diagnostic workstation. Further, the reconstruction control unit may also be associated to such a diagnostic workstation (for example via network accesses, like FTP and others).

The reconstruction control unit serves to reconstruct and visualize a digital breast tomosynthesis volume, with:

an input interface for receiving the digital breast tomosynthesis volume or a set of projections a detector for applying a computer aided detection algorithm to the digital breast tomosynthesis volume or a set of projections in order to detect at least one region of interest a determination unit which is adapted for determining a type of lesion in the respective detected region of interest a memory interface for accessing a memory unit with a look up table which stores an association between a lesion type and reconstruction algorithms and specific reconstruction parameters a reconstruction unit for reconstructing the at least one region of interest with lesion type specific reconstruction parameters a display, which is used for visualizing the digital breast tomosynthesis volume or the projections a selection signal interface which is adapted to receive a user selection signal identifying a selection area in the visualized digital breast tomosynthesis volume or in the projections, wherein the control unit is adapted to control the reconstruction and the display of the digital breast tomosynthesis volume or the projections, so that a pre-computed or an online computed reconstruction of the selection area is visualized according to determined lesion type-specific reconstruction parameters in case the selection area is comprised in the region of interest and so that a magnified, inverted or another available visualization of the selection area is visualized in case no pre-computed reconstruction for the selection area is available.

Preferably, the memory unit which may be implemented in the form of an in-memory database or of a relational database is not comprised within the control unit but is provided as a separate instance, which is accessed by means of the memory interface. Another embodiment refers to integrating and embedding the memory unit directly in the control unit or in the workstation, on which the control unit is installed.

Preferably, the invention with the control unit is implemented within an acquisition system (image acquisition, such as x-ray etc.). However, it has to be noted that the invention (hardware and/or software) may also be implemented within a diagnostic workstation. Then, diagnosis may be executed much more efficiently and the amount of data will be reduced (also in the context for archiving).

Another aspect of the invention is to be seen in a computer program being loadable in a memory of a computer, wherein the computer program is adapted to carry out the steps of the method as mentioned above.

The figures illustrate principles of the invention according to specific embodiments. Thus, it is also possible to implement the invention in other embodiments, so that these figures are only to be construed as examples. Moreover, in the figures, like reference numerals designate corresponding modules or items throughout the different drawings.

That is, although the invention is illustrated and described herein as embodied in a lesion-type specific reconstruction and display of a digital breast tomosynthesis volumes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is a visualization of a lens option of a rotating mammogram showing a calcification cluster;

FIG. 5 is an enlarged region of interest visualization around the lens, depicted in FIG. 4.

DESCRIPTION OF THE INVENTION

Figure 1:
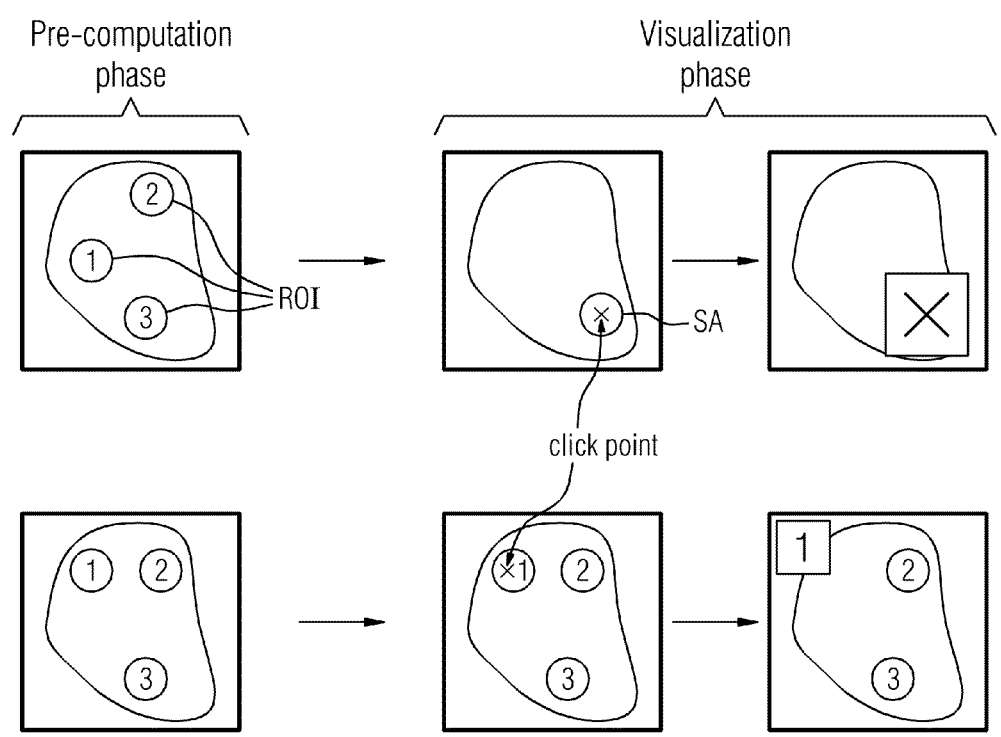
FIG. 1 is a schematic illustration of a visualization process for a medical tomosynthesis volume and a differently reconstructed selected area, which is defined by user click on the tomosynthesis volume according to a preferred embodiment of the present invention.

The present invention refers to an image reconstruction and visualization method for a three-dimensional digital breast tomosynthesis volume or for a set of projections. The method preferably consists of two phases, namely, a pre-computation phase and a visualization phase.

A. Pre-Computation Phase

The pre-computation phase is executed before visualization of the digital breast tomosynthesis volume with the selected area (selection area). The volume to be reconstructed may be provided by means of a memory or may be acquired by a tomosynthesis apparatus. After having received the tomosynthesis volume the volume is analyzed by applying a computer-aided detection algorithm in order to detect one region of interest (ROI) of the volume or several regions of interest (for example in case of clusters of calcifications). Further, the detected regions of interests are analyzed by determining a type of lesion. The type of lesion refers to different medical structures, like scars, calcifications and masses etc. A major aspect of the present invention is to be seen in that reconstruction may be executed specifically, depending on the type of lesion. This is performed by accessing a memory, particularly a look up table, in order to determine lesion type specific reconstruction parameters, which are applied during reconstruction. Moreover, it is possible to select different reconstruction algorithms (for example filtered back projection or maximum intensity projection etc.), depending on the type of lesion at hand.

According to a preferred embodiment of the present invention it is possible that the pre-computation phase also comprises the step of pre-computing different visualizations of all or selected regions of interest according to the determined lesion type specific reconstruction algorithms and reconstruction parameters.

B. Visualization Phase

The visualization phase is adapted to visualize the digital breast tomosynthesis volume in a first visualization manner. After having received a user selection signal, identifying selection area in the visualized digital tomosynthesis volume or in the 2D-projection, an additional visualization in a second manner is generated. The second visualization may be generated by:

Visualizing a pre-computed or an online computed reconstruction of the selected area (being defined by the user click) according to the determined lesion type specific reconstruction parameters (of the pre-computation phase) in case the selection area is comprised within the region of interest or within one of the regions of impressed, having been defined in the pre-computation phase;

Visualizing a magnified visualization of the selection area in case no pre-computed reconstruction is available for the respective selection area. Optionally, it is also possible to run an online computation for a specific reconstruction of the selected area, to wait for the reconstruction result and after having received the reconstruction result, to visualize the online computed reconstruction of the selected area for display. The latter step may be executed alternatively to the visualization of the magnified visualization or may be executed in addition to visualizing the magnified visualization of the selection area. Thus, it is possible to visualize two different visualizations of the selected area, namely a magnified visualization and an online computed specific reconstruction of the selected area according to lesion type reconstruction parameters. The additional visualizations may be represented in separated windows on the display. The windows may be overlaid on the tomosynthesis reconstruction or may be embedded in the same.

In the following, a short explanation and definition of terms, used within this disclosure is given.

The term "digital breast tomosynthesis volume" refers to a three-dimensional breast volume, acquired by a tomosynthesis apparatus. The volume consists of a set of two-dimensional images, which may be referred to as slices or slabs (in case of 0.5 mm to 2 mm thickness). Therefore, the term "digital breast tomosynthesis volume" may also be construed as comprising a set of 2 dimensional images. Thus, the method is to be applied to the DBT volume or to a two-dimensional projection. This is a major advantage because some CAD algorithms work on the slices of the reconstructed DBT volume and some directly on the acquired projections without going through the reconstruction first.

The computer-aided detection algorithm is an automatic process for detecting specific anatomical structures in a reconstructed volume. It is also referred to as computer-assisted detection and is consigned to marking conspicuous structures and sections in a three-dimensional volume or in two-dimensional projections. These systems are adapted to evaluate the suspicious structures and highlight microcalcification clusters and hyperdense structures in soft tissue. These algorithms typically perform fully automatically. Some CAD algorithms may be based on pattern recognition procedures. Hence, the CAD algorithm is used to classify diagnostically relevant regions in a reconstructed volume (or in the originally acquired projections before the reconstruction) and non-relevant regions. Within the relevant regions some regions of interest may be defined. The regions of interest are typically reconstructed differently from the remaining part of the volume (particularly from the non-relevant region, which may be reconstructed with a lower resolution). A person skilled in the art will understand that the number of regions is not restricted. Moreover, it is possible to cluster some regions. Typically the classification is based on the information density in the respective volumes.

The term "selection area" or "selected area" is to be construed as a region or an area in the digital breast tomosynthesis volume (or projection) which has to be visualized in more detail or with different reconstruction methods. The selection area may be defined by a user click. However, the click point will be detected and a pre-configurable area around the click point will be defined as selection area. In a pre-configuration phase it is possible to define a radius which has to be considered as selection area around the click point. According to a preferred embodiment the digital breast tomosynthesis volume may be classified or divided into two distinct sets: a selection area and a remaining DBT volume. The latter refers to the "rest" of the volume and which is not included in the selection area.

Different Scenarios have to be Distinguished.

It is possible that the click point is within or is part of a region of interest. In this case it is evaluated if a pre-computed reconstruction of the region of interest already exists. If yes, this pre-computed reconstruction is visualized. In case no such reconstruction is available, a magnified or another visualization (for example in inverted grayscale) which is available on the system and computed online of the respective selection area is visualized.

If the click point is not within a region of interest, typically no pre-computed reconstruction does exist. In this case it is possible to perform the method steps, described above, namely to visualize a magnified or another visualization of the selection area. Alternatively or additionally it is possible to compute a reconstruction of the selection area according to the lesion type specific reconstruction parameters. In this case, after reconstruction, the result is visualized. The above-mentioned procedure is explained in more detail with respect to FIG. 3.

After starting the procedure in step 1, the DBT volume is received.

After applying the computer-aided detection algorithm in step 2, the at least one region of interest (ROI) is detected.

In step 3 the type of lesion is determined for each detected region of interest. In case several regions of interest are detected by the CAD algorithm in step 2, it is necessary that for each region of interest the specific type of lesion is determined in step 3.

In step 4 a look up table LUT is accessed in order to determine lesion type specific reconstruction parameters. Preferably the look up table stores reconstruction parameters and/or reconstruction algorithms for different lesion types. For example, a maximum intensity projection (MIP technique) could be applied to reconstruct slabs containing calcification clusters, whereas an average intensity projection (AIP technique) is to be used to reconstruct slabs through the masses. For regions of lower diagnostic relevance (hence, regions, which are not detected as regions of interest in step 2) may be reconstructed according to filtered back projection, which is a less resource intensive (and thus "cheaper") reconstruction method. The look up table is stored in a memory, which may be part of the workstation or which may be accessed via network connections. Therefore, it is possible to amend the associations between the parameters and the algorithms (or reconstruction parameters) also during method execution. Further, the amendments may be executed separately from the execution of the reconstruction and display method. This is important in case new scientific information may be gathered according to specific lesions which are to be reconstructed specifically.

After step 4 it is possible to execute a pre-computation for all or for a selection of the regions of interest and to store the same in a (for example local) memory. Another possibility is not to pre-compute these reconstructions and to directly branch to step 6 by visualizing the digital breast tomosynthesis volume on a monitor of a corresponding workstation. Step 5 is optional. Step 5 refers to pre-computing specific regions of interest in the pre-computation phase.

In step 7 a user signal is detected in order to identify a selection area in or on the visualized digital breast tomosynthesis volume.

In response to the user selection signal a check is performed in step 8. It is evaluated if a reconstruction for the selection area already does exist.

Figure 3:
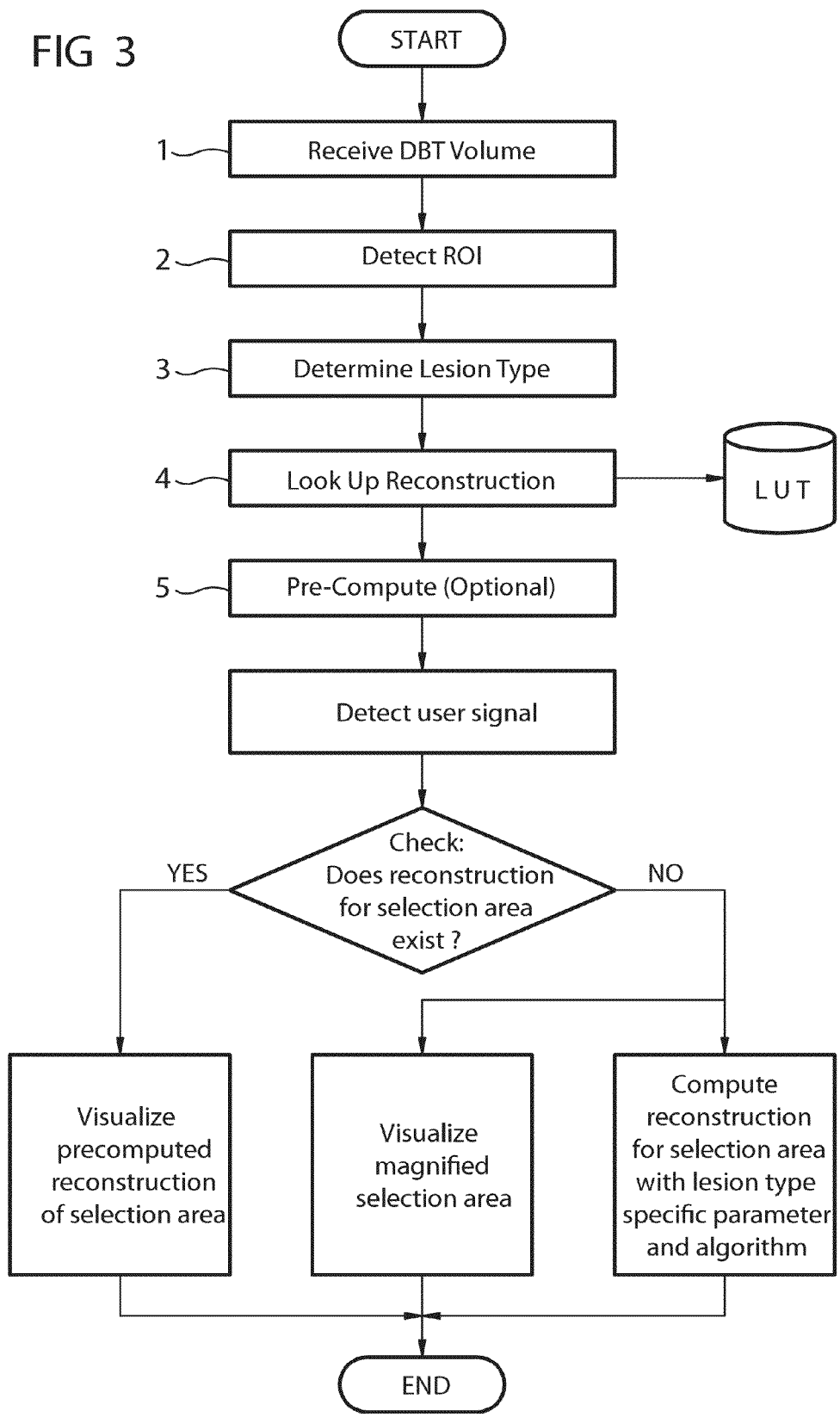
FIG. 3 is a flowchart of a reconstruction and visualization method according to a preferred embodiment of the present invention.

As can be seen in FIG. 3 on the left-hand side, in case such a reconstruction already exists, this pre-computed reconstruction of the selection area is visualized on the screen and after this the method ends.

In case no such pre-computation exists there are two options. First, it is possible to visualize a magnified or another visualization of the selection area available for on-line computation on the given system or a reading workstation, before the method ends. As a second option it is also possible to online compute a reconstruction of the selection area with the lesion type specific reconstruction parameters, which have been determined in step 4 of the pre-computation phase. After waiting for the result of the reconstruction, the reconstruction is visualized on the screen, before the method ends.

FIG. 1 shows the two scenarios of the selection area. On the left-hand side three regions of interest are detected in the pre-computation phase, which in FIG. 1 are depicted with the numerals 1, 2, 3 within a circle. The representation of the visualization in the middle refers to the visualization phase. Here, the digital breast tomosynthesis volume is visualized and the user clicks on a position, which in FIG. 1 is depicted with a cross ("x") within a circle. As can be seen in the upper row, the user has clicked on a position (which in FIG. 1 is depicted with the cross within a circle in the middle representation) which is not part of a region of interest. Thus, the resulting visualization is depicted on the right-hand side. Here, the digital breast tomosynthesis volume is visualized without changes and the selection area is visualized in a magnified manner. In FIG. 1 in the upper row on the right-hand side this is represented with the enlarged visualization of the "X". In this case no pre-computed reconstruction is available and, thus, only a magnified visualization is displayed on the screen.

On the lower row in FIG. 1 there is depicted the other scenario, in which the user clicks on a position, which is comprised in one of the regions of interest. In FIG. 1 the user has clicked on a position, depicted with the "X" cross, which is part of region of interest 1. As several regions of interest reconstructions have been pre-computed, in this example a reconstruction of the selection area and the region of interest 1 is available. As can be seen on the right-hand side in the lower row of FIG. 1 the digital breast tomosynthesis volume is visualized as before, but additionally the selection area, corresponding to the region of interest 1 is visualized according to the pre-computed reconstruction of the region of interest 1. Thus, a physician gets a high resolution reconstruction of the region of interest 1 (for example referring to a classification cluster).

Figure 2:
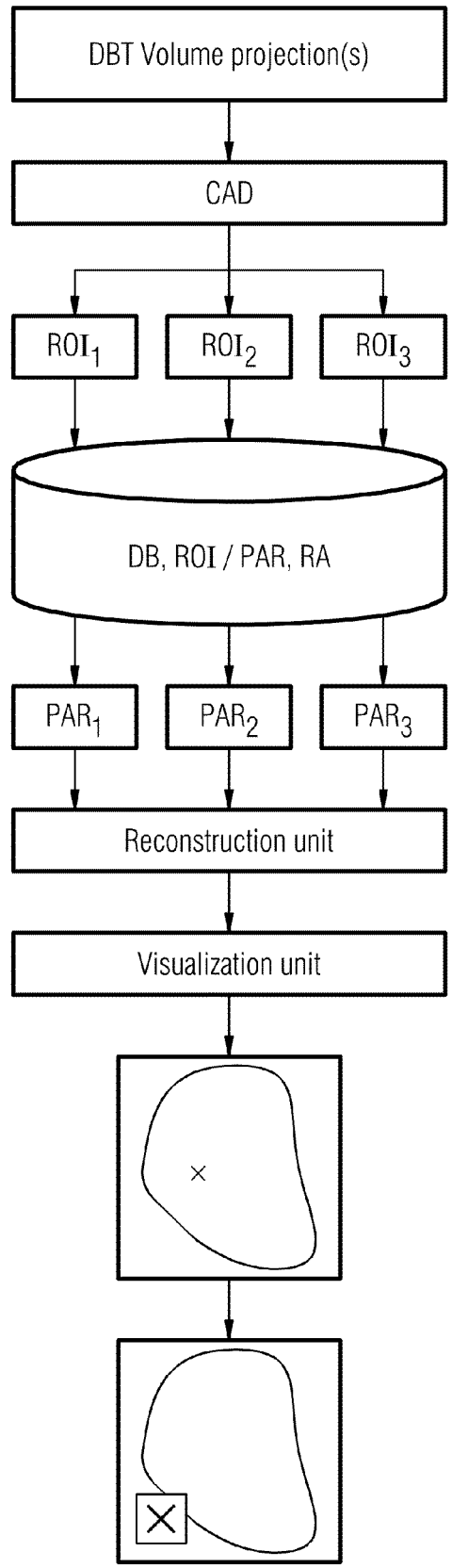
FIG. 2 is another schematic illustration of a reconstruction and visualization process according to a preferred embodiment for the present invention.

FIG. 2 shows a typical workflow with the computer-based instances. A digital breast tomosynthesis volume or a set of projections serve as input parameters for a computer-aided detection algorithm, which is represented with the box "CAD" in FIG. 2. The result of the CAD algorithm is a set of regions of interest, which are represented with the boxes "$ROI_1$", "$ROI_2$", "$ROI_3$" . . . in FIG. 2.

After having detected the regions of interest (ROI) the specific type of lesion in the region of interest is determined, by accessing a look table or a database in order to determine lesion type specific reconstruction parameters and/or lesion type specific reconstruction algorithms. Generally, two different embodiments are possible. First, it is possible to distinguish between determining a type of lesion in the detected region of interest and accessing a look up table. In this case two different process steps are executed. Second, it is possible to merge steps 3 and 4 of the method and to combine determining a type of lesion and the accessing of a look up table.

After having determined the lesion type specific reconstruction parameters and reconstruction algorithms, the results are inputted to the reconstruction unit in order to execute reconstruction of the specific region of interest. The result of the reconstruction unit is forwarded to the visualization unit. After having received the volume to be visualized, the visualization unit visualizes the digital breast tomosynthesis volume on the screen. After having received a user selection signal, for identification of the selection area, an additional visualization of the respective selection area is visualized, as can be seen in FIG. 2 in the last step. The identification of the selection area is represented in FIG. 2 in the last but one step by means of the reference "X."

FIG. 4 refers to an overview representation of a visualization with a lens option with a rotating mammogram representation of a calcification cluster, embedded in regular slices. It is also possible to visualize the separate window (lens) as an overlay on the regular slices. In FIG. 4 the regular slices of the tomosynthesis volume have been reconstructed with filtered back projection procedures (FBP). As can be seen in FIG. 4, the digital breast tomosynthesis volume is shown as an overview representation and additionally a selection area (represented in FIG. 4 with the dark rectangle on the left lower side of the breast) is visualized in addition to the regular volume. The additional visualization comprises more information for the selection area with respect to diagnosis (for example a representation of the region in higher resolution).

FIG. 5 shows an enlarged region of interest around the lens of the representation of FIG. 4. As can be seen in FIG. 5, more detailed information is available in the separate window, which in FIG. 5, is overlaid on the regular slice of the reconstructed volume.

Figure 6:
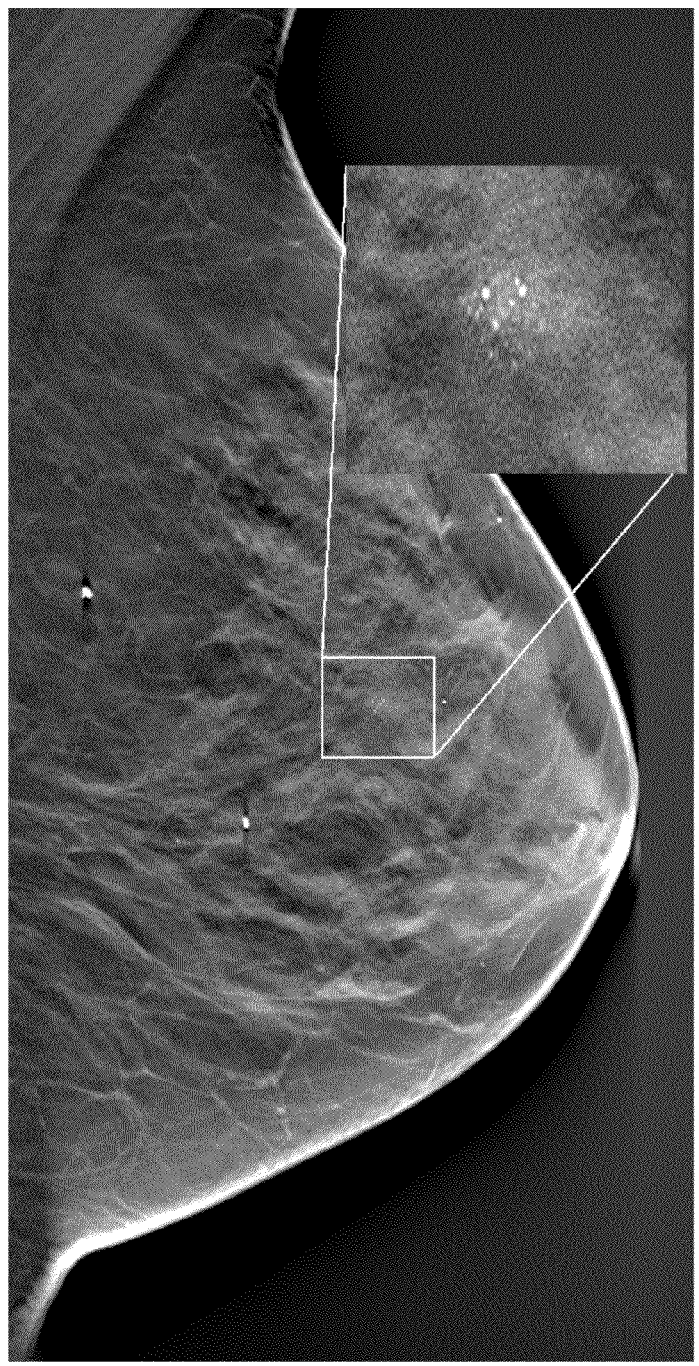
FIG. 6 is another visualization according to a preferred embodiment of the present invention with a lens with a high resolution reconstruction of a calcification cluster embedded in or overlaid on other projections of the digital breast tomosynthesis volume.

FIG. 6 shows a slice of a digital breast tomosynthesis volume with a lens representation, wherein the lens represents the selection area and is represented in FIG. 6 with the square in the middle of the breast. The square represents the selection area, which has been defined by the user. As can be seen in FIG. 6 in addition to the representation of the regular slice a separate window is visualized (depicted in FIG. 6 in the right upper part on the FIG.) showing another specific reconstruction of the selection area. This specific reconstruction refers to a higher resolution of the data, which has been chosen to be optimized for the specific type of lesion in this area. As can be seen in FIG. 6 the lens refers to the bigger square on the upper part of the FIG. with a higher resolution reconstruction of a calcification cluster embedded in or overlaid on the regular slice reconstruction, which has been reconstructed in this example here with filtered back projection (a "cheaper" reconstruction algorithm with respect to time and resource consumption). The selection area is reconstructed with higher resolution. Alternatively, the selection area is reconstructed with a totally different reconstruction algorithm than the entire DBT volume (i.e. the rest of the DBT volume). "Rest" or "remaining part" in this respect refers to the areas or regions in the volume, which have not been marked as regions of interest.

The selection area is visualized differently as the remaining volume of the digital breast tomosynthesis volume. As can be seen in FIG. 4-6 the selection area is visualized in a separate window which may be overlaid on the regular slice window or which may be directly embedded in the latter. The selection area, thus, is visualized in separate windows showing more detailed information than the rest of the breast volume.

Typically the selection area is visualized concurrently to the visualization of the digital breast tomosynthesis volume. Particularly, the selection area is visualized in an overlay window on a user interface, which will be generated and displayed for a predetermined and configurable time interval upon receiving the user selection signal. After the time interval has elapsed, it is possible to configure that the additional window with the visualization of the selection area will vanish again, so that only the "normal" tomosynthesis volume will be visualized. This has the advantage that the user may iteratively click on different positions on the volume in order to generate different selection areas which are visualized in sequence or concurrently.

The selection area is reconstructed in higher resolution, compared to the resolution of the entire or remaining volume. Moreover, it is possible to apply lesion type specific reconstruction parameters for reconstruction of the selection area, which are optimized for the specific type of lesion, which is represented in the selection area.

The following is a list of reference numerals and acronyms used in the above description:
DBT volume digital breast tomosynthesis volume
CAD algorithm computer-aided detection algorithm
ROI region of interest
SA selection area
1 receiving DBT volume
2 applying CAD algorithm
3 determining type of lesion
4 determine lesion type specific reconstruction parameters and reconstruction algorithm
5 pre-compute reconstruction of region of interest
6 visualize DBT volume or set of projection
7 detect user signal, defining selection area

The invention claimed is:

1. A computer-implemented method for reconstructing and visualizing a digital breast tomosynthesis volume, the method comprising the following steps:
   in a pre-computation phase:
      receiving at least one of the digital breast tomosynthesis volume or a set of projections;
      applying a computer aided detection algorithm to the digital breast tomosynthesis volume or the set of projections in order to detect at least one region of interest;
      determining a specific type of lesion is in the respectively detected region of interest;
      accessing a look up table to determine lesion type-specific reconstruction parameters; and
      reconstructing the at least one region of interest with lesion type-specific reconstruction parameters;
   in a visualization phase:
      visualizing the digital breast tomosynthesis volume or the projections and receiving a user selection signal identifying a selection area in the visualized digital breast tomosynthesis volume or the projections;
   in response to the user selection signal:
      visualizing a pre-computed or on-line computed reconstruction of the selection area according to determined lesion type-specific reconstruction parameters in case the selection area lies within the region of interest; and
      visualizing a magnified, inverted or other available visualization of the selection area in case no pre-computed reconstruction for the selection area is available.

2. The computer-implemented method according to claim 1, which comprises computing the lesion type-specific reconstruction of the selection area online in the visualization phase.

3. The computer-implemented method according to claim 1, which comprises reconstructing the selection area differently from a remaining digital breast tomosynthesis volume.

4. The computer-implemented method according to claim 1, which comprises visualizing the selection area differently from a remaining digital breast tomosynthesis volume.

5. The computer-implemented method according to claim 1, which comprises visualizing the selection area concurrently with the visualization of the digital breast tomosynthesis volume or the projections.

6. The computer-implemented method according to claim 5, which comprises visualizing the selection area in an overlay window on a user interface and generating and displaying the overlay window for a predetermined and configurable time interval upon receiving the user selection signal.

7. The computer-implemented method according to claim 1, which comprises reconstructing the selection area in higher resolution than a resolution of the remaining volume and/or with lesion specific reconstruction parameters that are optimized for a type of lesion.

8. A reconstruction control unit for reconstructing and visualizing a digital breast tomosynthesis volume, the control unit comprising:
   an input interface for receiving the digital breast tomosynthesis volume or a set of projections;
   a detector for applying a computer aided detection algorithm to the digital breast tomosynthesis volume or a set of projections in order to detect at least one region of interest;

a determination unit configured for determining a specific type of lesion is in the respective detected region of interest;

a memory unit with a look up table storing an association between a lesion type and reconstruction algorithms and specific reconstruction parameters;

a reconstruction unit connected to said memory unit for reconstructing the at least one region of interest with lesion type-specific reconstruction parameters;

a display configured for visualizing the digital breast tomosynthesis volume or the projections;

a selection signal interface configured to receive a user selection signal identifying a selection area in the visualized digital breast tomosynthesis volume or in the projections;

wherein said control unit is configured to control the reconstruction and the display of the digital breast tomosynthesis volume or the projections, such that:

a pre-computed or an online computed reconstruction of the selection area is visualized according to determined lesion type-specific reconstruction parameters in case the selection area is contained in the region of interest, and such that:

a magnified, inverted or other available visualization of the selection area is visualized in case no pre-computed reconstruction for the selection area is available.

9. The reconstruction control unit according to claim 8, wherein the reconstruction control unit is part of, or associated with, a diagnostic workstation.

* * * * *